(12) United States Patent
Fryda et al.

(10) Patent No.: US 8,366,945 B2
(45) Date of Patent: Feb. 5, 2013

(54) DIAMOND ELECTRODE AND PROCESS FOR PRODUCING IT

(75) Inventors: Matthias Fryda, Itzehoe (DE); Thorsten Matthee, Hohenaspe (DE)

(73) Assignee: Condias GmbH, Itzehoe (DE)

( * ) Notice: Subject to any disclaimer, the term of this patent is extended or adjusted under 35 U.S.C. 154(b) by 440 days.

(21) Appl. No.: 12/337,770

(22) Filed: Dec. 18, 2008

(65) Prior Publication Data

US 2009/0169815 A1 Jul. 2, 2009

(30) Foreign Application Priority Data

Dec. 21, 2007 (EP) .................................... 07024925

(51) Int. Cl.
*H01B 13/00* (2006.01)
*B44C 1/22* (2006.01)
(52) U.S. Cl. ............... 216/13; 216/53; 216/93; 216/108
(58) Field of Classification Search ........................ None
See application file for complete search history.

(56) References Cited

U.S. PATENT DOCUMENTS

| 3,592,715 | A | * | 7/1971 | Lindstrom | ............... 156/345.15 |
| 3,887,403 | A | * | 6/1975 | Coggins | ........................ 216/109 |
| 5,900,127 | A | * | 5/1999 | Iida et al. | ................. 204/290.08 |
| 2005/0014066 | A1 | * | 1/2005 | Shimamune | ............... 429/231.5 |

* cited by examiner

*Primary Examiner* — Duy Deo
*Assistant Examiner* — Bradford Gates
(74) *Attorney, Agent, or Firm* — Whitham Curtis Christofferson & Cook, PC

(57) ABSTRACT

Diamond electrodes with improved adhesion of the diamond layer to the electrode are produced by sandblasting a surface of the electrode body, and then non-oxidatively etching the roughened (sandblasted) surface so as to remove at least 5 μm of material from under the roughened surface. By removing at least 5 μm of material, the sand particulates in the surface of the electrode body are eliminated, and damage in the form of cracks in the electrode body which result from sandblasting is reduced or eliminated, and further, a surface metal oxide coating is not created. All of these contribute to preparing a surface where spalling of the diamond layer is less likely to occur. Concentrated phosphoric acid is an exemplary non-oxidative etchant used in the process.

16 Claims, 3 Drawing Sheets

DIAMOND ELECTRODE AND PROCESS FOR PRODUCING IT

FIELD OF THE INVENTION

The invention relates to a process for producing a diamond electrode, comprising the following process steps:
- roughening the surface of the electrode body by sand blasting,
- etching the roughened surface, and
- building up the diamond layer on the electrode body.

The invention also relates to a diamond electrode produced by this process.

By virtue of the high overvoltage which diamond electrodes can generate, the latter have already proved to be appropriate for numerous electrochemical applications and, on account of their superior properties, indicate prospects for numerous further applications.

BACKGROUND

Diamond electrodes of this type are produced in a known manner by a diamond layer being built up on a metallic electrode body under defined ambient conditions. The problem with this process is that a stable connection has to be ensured between the diamond layer and the electrode body. In order to improve this connection, it is known to bombard the surface of the electrode body with particles of a size of from 20 to 100 µm by means of a sand blasting process in order to thereby produce a topographically nonuniform surface—and therefore an enlarged contact surface with the diamond layer. The particles used in this process may be formed from any sufficiently hard material that does not react with the material of the electrode body. A preferred material is sic.

In some applications, nevertheless, the adhesion of the built-up diamond layer to the electrode body having a surface roughened in this way does not have the desired stability. In particular, spalling of the diamond layer from the electrode body may occur.

Investigations have revealed that one cause of the spalling is that a not inconsiderable quantity of sand blasting particles are mechanically anchored in the surface of the electrode body during the sand blasting process, and therefore there are between $10^3$ and $10^4$ blasting particles in each square centimeter of the electrode surface after the sand blasting. In this process, the blasting particles are more or less firmly anchored in the surface, in which case the loosely anchored blasting particles could represent a cause of the spalling of the diamond layer which has been built up.

It has therefore been proposed to etch the surface using a conventional oxidative etchant, such as hydrofluoric acid (HF) or nitric acid ($HNO_3$), after the sand blasting. In fact, etching with hydrofluoric acid has succeeded in reducing the number of blasting particles per square centimeter of electrode surface to below 5. Nevertheless, this measure has not resulted in improved diamond electrodes. Firstly, a metal oxide is formed during etching, i.e. niobium oxide in the case of a preferably used electrode body composed of niobium, and this permits only impaired adhesion of the diamond layer. Furthermore, the electrode surface which is embrittled during etching results in delamination of the diamond layer.

A problem present in the prior art is therefore that many of the diamond electrodes produced become unusable owing to spalling of the diamond layer, and therefore thorough testing has to be carried out. This makes the diamond electrodes considerably more expensive. In addition, the diamond electrodes have to be handled very carefully since they also tend toward spalling of the diamond layer when in use.

SUMMARY

The present invention is therefore based on the problem of improving the production of diamond electrodes in such a way that improved adhesion of the diamond layer to the electrode body is ensured, and therefore the defect rate during the production of the diamond electrodes can be considerably reduced and the diamond electrodes are less sensitive when in use.

DETAILED DESCRIPTION

In order to solve this problem, according to the invention, a process of the type mentioned in the introduction is characterized in that non-oxidative etching of the electrode body is performed in such a way that more than 5 µm of the material of the electrode body under the roughened surface is removed.

The process according to the invention is based on the inventors' findings obtained from extensive investigations and also on measures which resulted in surprising effects.

Experts have not considered the carrying out of a non-oxidative etching process to be promising. The present invention is based on the finding that non-oxidative etching on the electrode body may be successful if the etching parameters are set in a suitable manner. In this context, the etching process is used to remove more than 5 µm of the material of the electrode body under the roughened surface. This measure is based on the surprising finding that it is not primarily the connection between the diamond layer and the material of the electrode body that is responsible for the spalling of the diamond layer but rather the fact that this spalling is attributable to material damage, in particular in the form of cracks, which have occurred in the solid material of the electrode body during sand blasting, that is to say under the surface region which has obtained a peak and valley topography as a result of the sand blasting. Damage to the material of the electrode body which is under the valley bottoms of the topography produced by roughening is also at least responsible for the spalling of the diamond layer. In the etching process according to the invention, the material is removed homogeneously, and therefore the roughened topography is largely retained. In addition, more than 5 µm, preferably at least 10 µm, of the material is removed—even in the valley bottom of the topography—and therefore damage present in the material which extends to this depth is eliminated. Investigations have shown that the damage reaches at most up to 10 µm into the solid material—depending on the parameters of the preceding treatment steps—and therefore the damage is eliminated by removing approximately 10 µm of the solid material. Since the roughened surface results in differences in height (between the peak tip and the valley bottom) of approximately 10 µm and the cracks may extend under the tips of the topography, an etching rate of between 5 and 15 µm, preferably of approximately 10 µm, as set according to the invention, results in an etching period of from approximately 1.5 to 2.5 hours, with an etching period of 2 hours in practice at an etching rate of approximately 10 µm per hour proving to be appropriate. Of course, the non-oxidative etching carried out according to the invention also has the effect that sand blasting particles fired into the material of the electrode body are entirely or almost entirely removed, and therefore can no longer be a cause of problems with the adhesion of the diamond layer to the electrode body.

The etching process according to the invention is preferably performed using concentrated phosphoric acid having a concentration of >70%, preferably of 85%, at a temperature of between 140 and 180° C. A preferred temperature range is from 150 to 160° C. The etching process does not take place at a temperature of below 140° C. At a temperature of above 180° C., water present in the phosphoric acid is expelled too quickly, and this results in polymerization of the phosphoric acid to form polyphosphoric acid and the etching process stops.

Additives in the form of complexing agents are preferably added to the phosphoric acid. Suitable complexing agents are citric acid and EDTA.

In practice, it has been found to be expedient to add concentrated phosphoric acid during the etching process in order to maintain the selected concentration for the etching process within predetermined tolerances. The etching process consumes phosphoric acid, and therefore the concentration of the phosphoric acid may be reduced beyond the appropriate tolerance range during the etching process. This may be remedied by adding concentrated phosphoric acid.

The etching process according to the invention may be carried out using the batch process, that is to say with a suitable batch of the etchant, in particular phosphoric acid. It is also possible to incorporate the etching process in a continuous process. In this case, it is necessary to set the acid concentration to a desired concentration by adding evaporating water and adding consumed acid. In addition, the etched material has to be removed.

Electrode bodies composed of pure niobium are preferably used as electrode bodies for the diamond electrodes produced according to the invention. Suitable alternatives are, in particular, electrode bodies composed of tantalum, tungsten or—to a limited extent—titanium.

The diamond electrodes produced according to the invention exhibit significantly improved adhesion of the diamond layer to the electrode body. The etching process provided according to the invention means that the electrode body of the diamond electrode according to the invention is at least largely free of spalling and cracks, which were formed during the sand blasting process, under the topography formed by the roughening.

The diamond electrode according to the invention thereby differs from conventional diamond electrodes and has the above-described, significantly improved adhesion properties.

Figure 1:
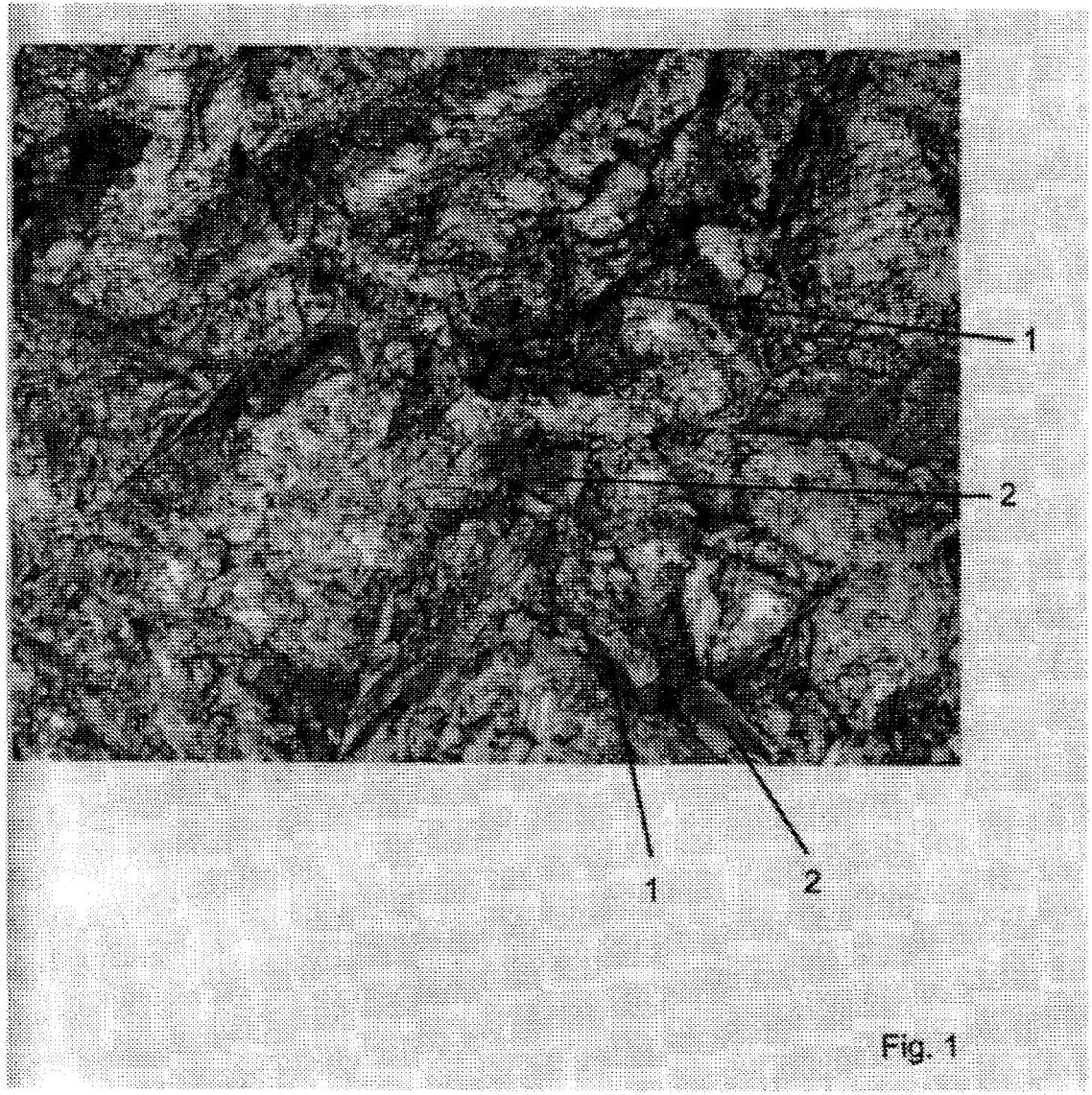
FIG. 1 shows a scanning electron microscope image of a surface of a niobium electrode body roughened by sand blasting. The image shows that the surface has cracks 1 and that sand blasting particles 2 are anchored in the surface. The roughness values Rz and Ra determined to DIN are between 15 µm and 25 µm (Rz) and between 2 µm and 4 µm (Ra).
Figure 2:
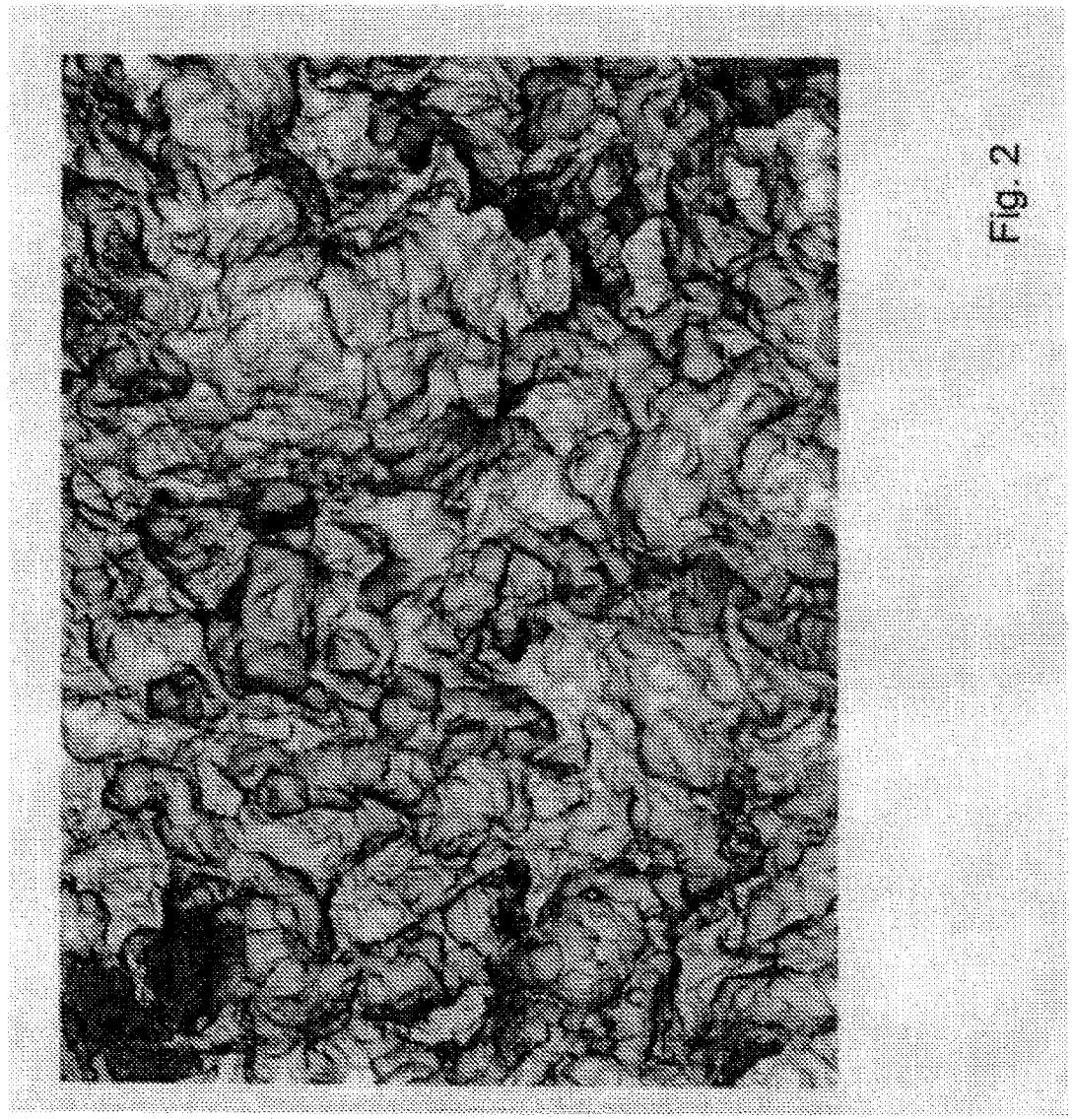
FIG. 2 shows a scanning electron microscope image of the surface shown in FIG. 1 after the etching process according to the invention. It can be seen that the surface is free of sand blasting particles and also virtually free of cracks 1. The roughness values for Rz have not significantly changed. The value for Ra may be reduced by approximately 10% as a result of the etching process. It can be seen that the etching has produced a rounded topography.
Figure 3:
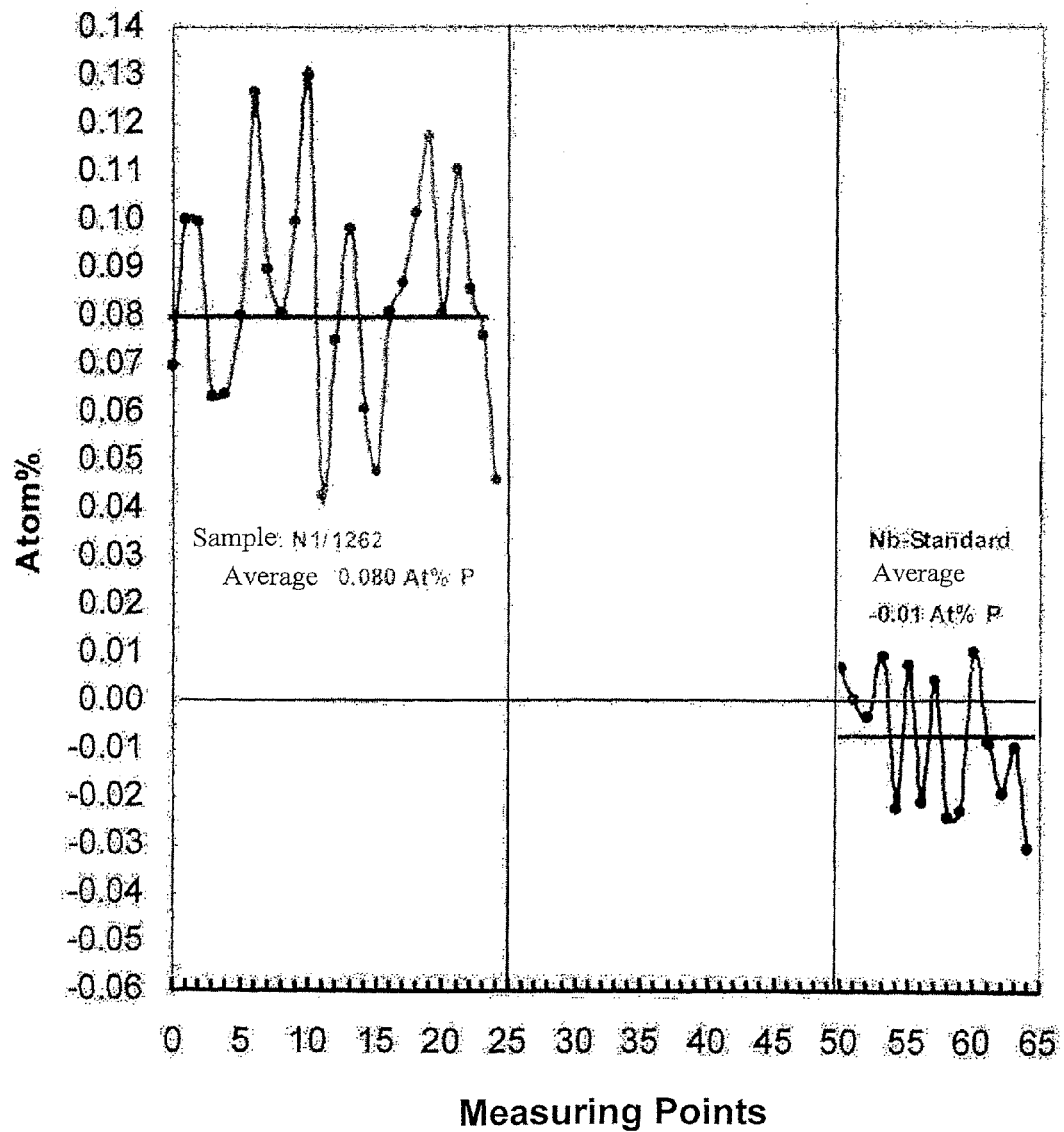

The diamond electrode according to the invention contains a concentration of the etchant on the surface of the electrode body. FIG. 3 shows analysis values for an analysis depth of approximately 100 nm for the P content in the surface of the electrode body.

The right-hand area of FIG. 3 shows the phosphorus content of the untreated niobium electrode body. Within the scope of measuring inaccuracy, a virtually phosphorus-free surface is produced.

By contrast, the surface of the electrode body which has been etched according to the invention using phosphoric acid has a considerably increased phosphorus content which is, on average, 0.08 atom %.

The invention claimed is:

1. Process for producing a diamond electrode, comprising the steps:
    roughening a surface of an electrode body by sand blasting to produce a roughened surface,
    etching the roughened surface by non-oxidative etching to produce an etched roughened surface, and
    building up a diamond layer on the electrode body at the etched roughened surface,
    wherein the etching step removes more than 5 µm of material from under the roughened surface of the electrode body.

2. The process according to claim 1, wherein the etching step is carried out at an etching rate of between 5 and 15 µm per hour.

3. The process according to claim 1, wherein the etching step is performed using concentrated phosphoric acid (>70% by weight) at a temperature of between 140 and 180° C.

4. The process according to claim 3, wherein said concentrated phosphoric acid is 85% by weight strength phosphoric acid.

5. The process according to claim 1, wherein said etching step is performed with concentrated phosphoric acid which includes complexing agents added to the concentrated phosphoric acid.

6. The process according to claim 1, wherein said etching step removes at least 10 µm of material.

7. The process according to claim 1, wherein said etching step is performed over a period of more than 0.5 hour.

8. The process according to claim 1, wherein said etching step is performed with concentrated phosphoric acid, and further comprising the step of adding concentrated phosphoric acid during the etching step in amounts selected order to maintain a selected concentration for etching within predetermined tolerances.

9. The process according to claim 1, wherein the electrode body is composed of pure niobium.

10. The process according to claim 1, wherein the electrode body composed of tantalum, tungsten or titanium.

11. The process according to claim 3 wherein said temperature is between 150 and 160° C.

12. The process according to claim 1 wherein said etching step removes 15 to 25 µm of material.

13. The process according to claim 1 wherein said etching step is performed over a period of at least one hour.

14. The process according to claim 1 wherein said etching step is performed for a period of 1.5 to 2.5 hours.

15. The process according to claim 1 wherein said etching step is performed with concentrated phosphoric acid over a period of at least 0.5 hours.

16. The process according to claim 1 wherein the electrode body is composed of niobium, tantalum, tungsten, or titanium, and wherein said etching step is performed with concentrated phosphoric acid.

* * * * *